United States Patent [19]

Miyashita

[11] Patent Number: 4,625,355
[45] Date of Patent: Dec. 2, 1986

[54] COPPER BIT CLEANER

[75] Inventor: Kyoichi Miyashita, Osaka, Japan

[73] Assignee: Earthnics Corporation, Tokyo, Japan

[21] Appl. No.: 681,827

[22] Filed: Dec. 14, 1984

[30] Foreign Application Priority Data

Dec. 21, 1983 [JP] Japan .................................. 58-242539
Nov. 10, 1984 [JP] Japan .................................. 59-236938

[51] Int. Cl.$^4$ ............................................. B08B 1/04
[52] U.S. Cl. ......................................... 15/93 R; 15/3; 15/104.04
[58] Field of Search ............. 15/93 R, 236 R, 236 A, 15/104.04, 3; 29/81 G, 81 J; 228/57

[56] References Cited

U.S. PATENT DOCUMENTS 2,635,393  4/1953  Barth ........................... 15/104.04 X
2,864,103  12/1958  Gerber ............................... 15/21 D
3,026,550  3/1962  Bollin .............................. 15/93 R X Primary Examiner—Edward L. Roberts
Attorney, Agent, or Firm—Koda and Androlia

[57] ABSTRACT

Herein disclosed is a copper bit cleaner which comprises a casing formed with a bit aperture for allowing the copper bit of a soldering tool to be inserted therethrough, and a plurality of solder residue scraping members having a flexibility and formed into a line, strip, ribbon or band shape. Solder residue scraping member holding means is cased in the casing for holding said solder residue scraping members in a straight, curved or looped shape. Drive means is used for rotationally driving the solder residue scraping member holding means at a high speed so that the solder residue scraping members may slide on the circumference of the copper bit, which is inserted through the bit aperture, at a high speed to scrape off the solder residue thereby to split the scraped solder residue off from the solder residue scraping members by the centrifugal forces thereof.

5 Claims, 16 Drawing Figures (a)            (b)

(a)    (b)

(a)　　　　　　(b)

COPPER BIT CLEANER

BACKGROUND OF THE INVENTION

1. Field of the Invention

The present invention relates to a cleaner for removing a solder residue from the copper bit of a soldering tool and, more particularly, to a copper bit cleaner for preventing the temperature of a copper bit from dropping when the solder residue is to be removed.

2. Description of the Prior Art

Removal of a solder residue from the copper bit of a soldering tool of the prior art is conducted by bringing the copper bit of the soldering tool into contact with a sponge pad, which is cased in a tray and impregnated with water, and by pulling the copper bit toward the operator and turning it clockwise and counter-clockwise to rub it on the sponge pad thereby to remove the solder residue and a wire residue (both of which will be shortly called the "solder residue") together with a surplus solder which has solidified with the water.

Because the cleaner using that sponge pad removes manually the solder residue, the cleaning operation takes a long time period (e.g., 3 to 5 seconds) to degrade the operating efficiency, and the solder residue removed scatters around the working table to invite a cause for dropping reliability of the products.

With a view to shortening the cleaning period and collecting the removed solder residue, therefore, there has been developed a copper bit cleaner which has another construction (as is disclosed in Japanese Patent Laid-Open No. 57-159264). The construction of the essential portion of the copper bit cleaner will be described in the following. In a casing formed with a bit aperture for allowing the copper bit to be inserted therethrough, first and second sponge rollers are borne by bearings such that they are pressed against each other under a predetermined pressure and that their abutting portions face the aforementioned bit aperture. On the shafts of those sponge rollers, respectively, there are fixed on gears which are in meshing engagement with each other. These gears are driven by a smaller gear which is fixed on the shaft of a reduction drive mechanism having a motor. As a result, the aforementioned sponge rollers are rotated through those gears in directions from the side facing the bit aperture to the abutting portions of the sponge rollers. One of the gears is made to have a more teeth than that of the other so that the sponge roller corresponding to the latter is rotated at a higher speed than the former sponge roller. A solder residue pan is mounted on the bottom of the casing and at the side opposite to that having the bit aperture. The construction thus far described belongs to the copper bit cleaner of the prior art.

In the copper bit cleaner thus constructed, the first and second sponge rollers are impregnated with water, and the copper bit of the soldering tool is forced through the bit aperture into the abutting portions of the first and second sponge rollers. Then, just similar action is established as the aforementioned one which is attained by holding the copper bit between the sponge pads of the cleaner and by pulling the copper bit therefrom in a wiping manner. By this action, the solder residue is removed from the copper bit, and this removed solder residue solidifies with the water contained in the first and second sponge rollers. The solid solder residue is scraped from the surfaces of the first and second sponge rollers by the self-cleaning action resulting from the difference between thier rotating speed, and it is accumulated in the residue pan.

The copper tip cleaner using such rotating sponge rollers has its cleaning period shortened several times and is freed from any scatter of the solder residue on the working table, as compared with the aforementioned cleaner using the sponge pads. Since the sponge rollers have to be impregnated with the water, however, the copper bit cleaner has a difficulty that the copper bit is cooled down. Another difficulty is that the sponge rollers have to be troublesomely supplied with a proper amount of water at least once a day.

SUMMARY OF THE INVENTION

The present invention has been conceived with the object to eliminate those difficulties and contemplates to provide a copper bit cleaner comprising: a casing formed with a bit aperture for allowing the copper bit of a soldering tool to be inserted therethrough; a plurality of solder residue scraping members having a flexibility and formed into a line, strip, ribbon or band shape; solder residue scraping member holding means cased in said casing and holding said solder residue scraping members in a straight, curved or looped shape; and drive means for rotationally driving said solder residue scraping member holding means at a high speed so that said solder residue scraping members may slide on the circumference of the copper bit, which is inserted through said bit aperture, at a high speed to scrape off the solder residue thereby to split the scraped solder residue off from said solder residue scraping members by the centrifugal forces thereof.

If the cleaning action of applying the side of the copper bit, which is inserted into the bit aperture, to the solder residue scraping members being rotationally driven and pulling it toward the operator is conducted several times while the copper bit being turned clockwise and counter-clockwise, the solder residue is removed from the copper bit by the actions of the solder residue scraping members. Most of the solder residue thus removed is scattered away by the solder residue scraping members. The solder residue left on the solder residue scraping members is let off by the centrifugal forces or frictional forces and is trapped in the casing.

The copper bit cleaner according to the present invention keeps the copper bit out of temperature drop and is substantially freed from any daily maintenance causing its waterless process.

BRIEF DESCRIPTION OF THE DRAWINGS

FIG. 2(*b*) is a front elevation showing the construction of FIG. 2(*a*);

FIG. 3(*b*) is a front elevation showing the construction of FIG. 3(*a*);

DETAILED DESCRIPTION OF THE PREFERRED EMBODIMENTS

Figure 1:
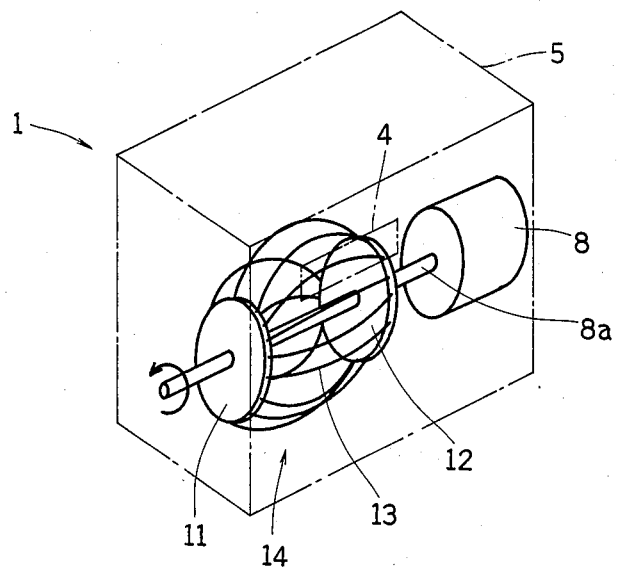
FIG. 1 is a perspective view showing a structure of the major portion of an embodiment of the present invention.

FIG. 1 is a perspective view showing the basic structure of a copper bit cleaner 1 according to one embodiment of the present invention, and FIGS. 2(a) and 2(b) are views for explaining the operations of a solder residue scraping drum 14 of the copper bit cleaner 1 shown in FIG. 1. Two disks 11 and 12 are fixed on the shaft 8a of a motor 8. A plurality of kite strings 13 having their respective two ends fastened on the circumferential edges of the two disks 11 and 12 with suitable slackness and at a suitable spacing thereby to construct the solder residue scraping members 13. Thus, the disks 11 and 12 and the plural kite strings 13 construct together the solder residue scraping drum 14 (which will be shortly called the "drum"). When this drum 14 is rotated at a high speed (e.g., 3,000 r.p.m.) in the direction of arrow, the kite strings 13 are turned by the centrifugal force in a centrally bulging form, as shown in FIGS. 2(a) and 2(b). If, in this state, the copper bit 3 of a soldering tool is inserted into a bit aperture 4, it comes into contact with the kite strings 13 at an angle, as shown in FIG. 2(a), so that the kite strings 13 slide at a high speed from the root to the tip of the copper bit 3, while being deformed along the circumference of the copper bit 3, as shown in FIG. 2(a) and 2(b), to remove the solder residue from the copper bit 3 by scraping it with their sides. As a result, a thin film of the solder is left to cover the surface of the copper bit 3. On the other hand, the solder residue thus scraped off is scattered away from the kite strings 13 by the centrifugal force and then it is caught and cooled by the wall surface of a casing 5 to solidify. In order to clean the whole circumference of the copper bit 3 with the use of the cleaner 1 thus constructed, the soldering tool has to be turned by 180 degrees. In this respect, it is very short period for the kite strings 13 to slide on the circumference of the copper bit 3 and the force pushing the kite string 13 onto the copper bit 3 is only the centrifugal force due to the weight of the kite strings 13 themselves, if the kite strings 13 are made thick, therefore, their wear raises no practical problem.

Incidentally, it is easy to collect the solder residue which has been scattered and sticked on the wall surface of the casing 5. Despite of this fact, however, it is quite natural that a solder residue receiving fence may be provided to enclose the drum 14 so that the solder residue may not be scattered into the casing 5.

Figure 3:
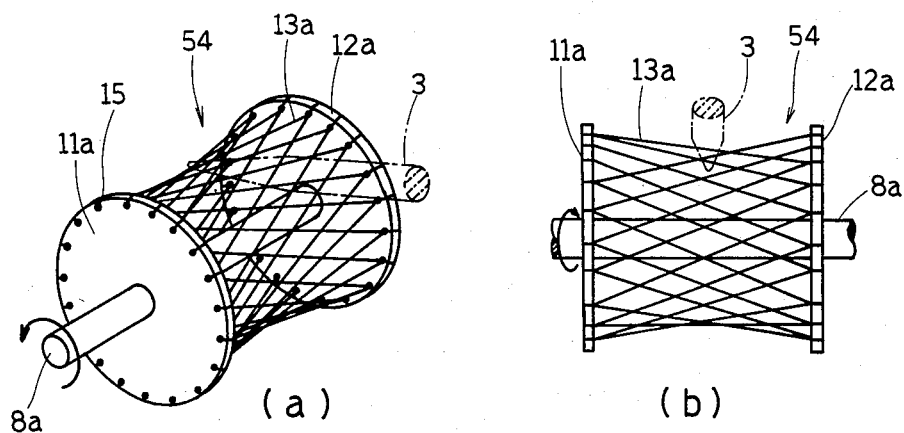
FIG. 3(*a*) is a perspective view showing another example of the construction of the solder residue scraping drum.
Figure 4:
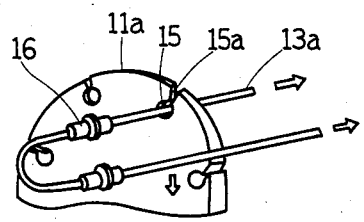
FIG. 4 is an enlarged perspective view showing a portion of one example of a kite string fixing mechanism of the solder residue scraping drum.

FIGS. 3(a) and 3(b) show a drum 54 having a construction according to another example. This drum 54 is constructed such that stop holes 15 having slits 15a, as shown in FIG. 4, are formed in the circumferential edges of two disks 11a and 12a and such that kite strings 13a having stoppers 16 fastened thereto are fixed at a predetermined spacing by threading through the slits 15a and by fastening the stoppers 16 in the stop holes 15 so that they are obliquely extended between the disks 11a and 12a. Thus, the kite strings 13a are shaped like an hourglass of which central portions thinned so that they come into obliquely sliding contact with the copper bit 3 thereby to improve their cleaning effect.

Figure 5:
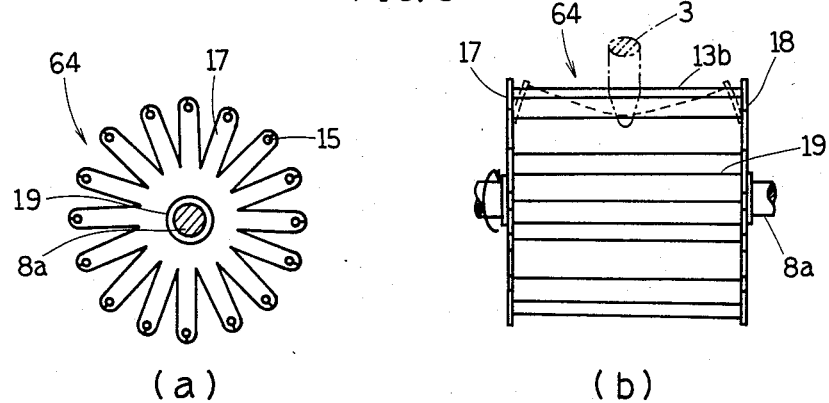
FIG. 5(a) is a side elevation showing still another example of the construction of the solder residue scraping drum.
FIG. 5(b) is a front elevation showing the construction of FIG. 5(a)

FIGS. 5(a) and 5(b) show a drum 64 having a construction according to still another example. This example is constructed by forming disks of a thin and elastic metal or synthetic resin plate into a spider shape, by fixing and supporting the spider disks 17 and 18 on a hub 19, and by extending kite strings 13b under tension between the leading ends of the respective fingers of the spider disks 17 and 18. With this construction, when the copper bit 3 is brought into contact with the kite strings 13b, the fingers of the disks 17 and 18 are warped as shown in broken lines in FIG. 5(b) thereby to damp the pressure to be applied to the kite strings 13b. When the kite strings 13b get out of contact with the copper bit 3, moreover, the solder residue is scattered away by the tension of the kite strings 13b due to the elasticity of the fingers of the spider disks 17 and 18. As a result, the kite strings 13b can be prevented from being sticked by the solder residue, even if they are made thick, to improve the cleaning effect and to elongate the lifetime of the cleaner.

In the embodiment being described, incidentally, the kite strings can be replaced by stainless steel wires, fine chains, or strings or ribbons of a highly wear-resistant material such as polyethylene terephthalate thereby to elongate a lifetime of the solder residue scraping members.

FIGS. 6(a) and 6(b) show a drum 74 having a construction according to a further example. The drum 74 is constructed such that film members 23 (acting as the solder residue scraping members), which have heat-resistant and elastic properties and are formed into the shape shown in FIG. 7(a), are fitted, with their central portions folded in two by fastening members 22, in grooves 21, which are formed in a hub 20 fixed on the shaft 8a, by means of fitting clampers 24 with both the ends to anchor the film members 23 radially on the hub 20. Films of polyethylene terephthalate or the like may be suitably used as the film members 23.

Moreover, the film members 23 may have their circumferential edges 25 cut into a shape of letter "V" so that their ends may come into contact with the copper bit 3 over a wide range of the circumference of the bit 3.

In the embodiment thus far described, the film members 23 act to scrape the solder residue with their end faces.

FIGS. 7(b) and 7(c) show modified film members 23a and 23b.

The film member 23a shown in FIG. 7(b) has its circumferential edge curved and formed with an aperture 26 to leave a peripheral band 27 at its peripheral edge portion. The peripheral bands 27 first have their outer edges 27a coming into abutment contact with the copper bit 3, and the film members 23a are then curved to have their bands 27 extending along the surface of the copper bit 3 so that their inner edges 27b scrape off the solder residue. The film members 23a thus modified have effects to improve the cleaning effect and to lighten the windage loss during rotations thanks to the provision of the apertures 26.

The film members 23b shown in FIG. 7(c) are formed with a plurality of cuts 28 extending in the radial direction. Thanks to the provision of the cuts 28, the film members 23b are made so soft that they can be made of thick films. The film members 23b thus modified can scrape off the solder residue with the end faces of their cuts 28 thereby to elongate the lifetime of the drum 74 and improve the cleaning effect of the same.

FIGS. 8(a) and 8(b) show a drum 84 having a construction according to a further example. In this construction, thick kite strings or hemp-palm fibers are held by means of fastening members 22a (such as wires) in fastening grooves 21a, which are formed in a hub 20d, such that they are folded into two and anchored radially. When the drum 84 thus constructed is rotated, solder residue scraping members 29 anchored come in their erected forms into contact with the copper bit 3 so that their leading end portions slide on the circumference of the copper bit 3 to scrape off the solder residue therefrom. The drum 84 thus constructed has effects that it can be easily produced and that its lifetime can be elongated.

All the drums 14, 54, 64, 74 and 84 shown in FIGS. 2, 3, 5, 6 and 8 can be applied to the cleaner 1 according to the embodiment shown in FIG. 1.

As has been described hereinbefore, however, the cleaner 1 shown in FIG. 1 is advantageous in that it has the simple construction but has a difficulty that the soldering tool has to be turned by 180 degrees so that its copper bit 3 may be cleaned all over its circumference.

FIGS. 9 to 12 show other embodiments for eliminating that difficulty, respectively.

Figure 2:
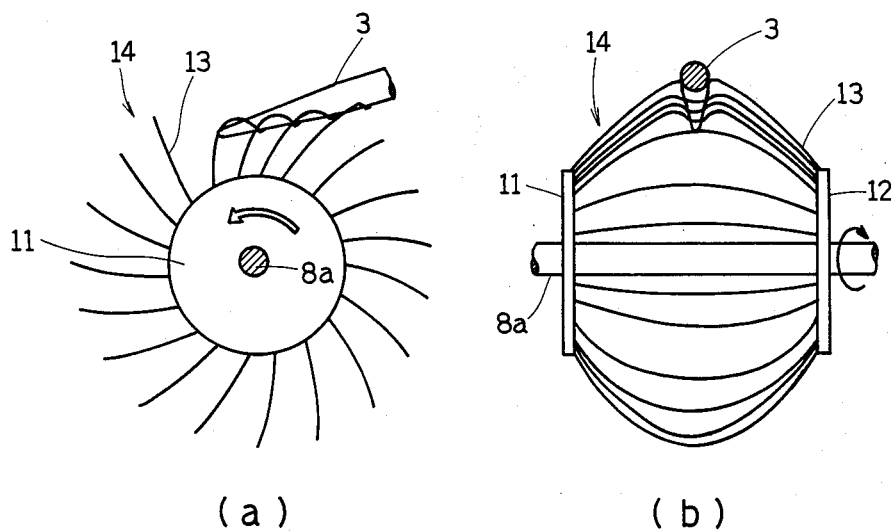
FIG. 2(*a*) is a side elevation showing one example of the construction of a solder residue scraping drum.
Figure 9:
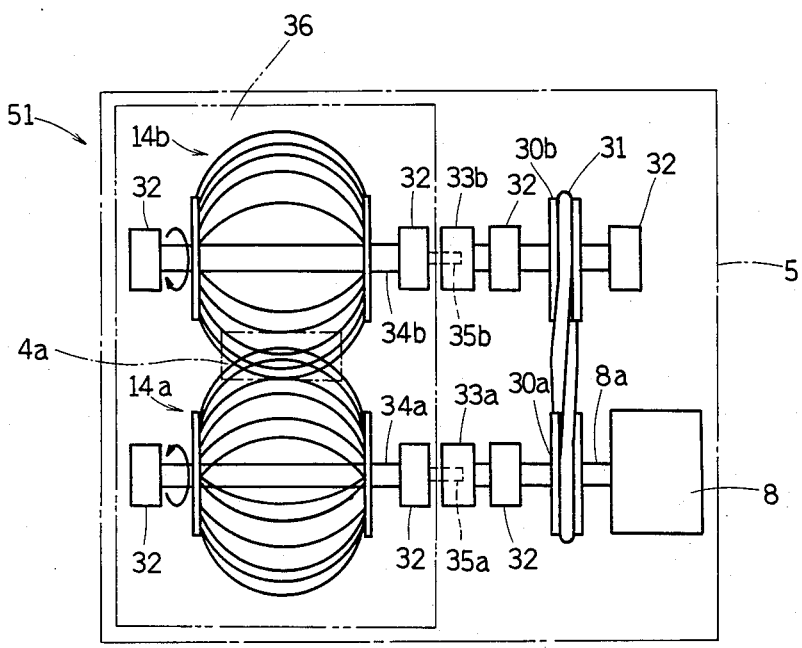
FIG. 9 is a front elevation showing another embodiment of the present invention.

A copper bit cleaner 51 shown in FIG. 9 is constructed such that two drums 14 shown in FIG. 2 are arranged to have their kite strings 13 intersecting at their central bulging portions, such that the two drums 14a and 14b are rotated in the opposite directions (i.e., in the directions of arrows) through a belt 31, and such that a bit aperture 4a is arranged to face the intersecting portions of the kite strings.

In FIG. 9: reference characters 30a and 30b indicate pulleys; numeral 31 indicates the crossed belt; and numeral 32 indicates bearings. Reference characters 33a and 33b indicate joints which are so constructed as to joint the jounals 35a and 35b of the shafts 34a and 34b of the drums 14a and 14b without any difficulty. A cartridge 36 housing the drums 14a and 14b can be mounted and demounted in its entirety for replacement.

When the copper bit 3 is inserted through the bit aperture 4a into the cleaner 51 thus constructed, the kite strings 13 come into contact with the upper and lower surfaces of the copper bit 3 so that the whole circumference of the copper bit 3 can be cleaned merely by turning the soldering tool slightly clockwise and counterclockwise.

Figure 6:
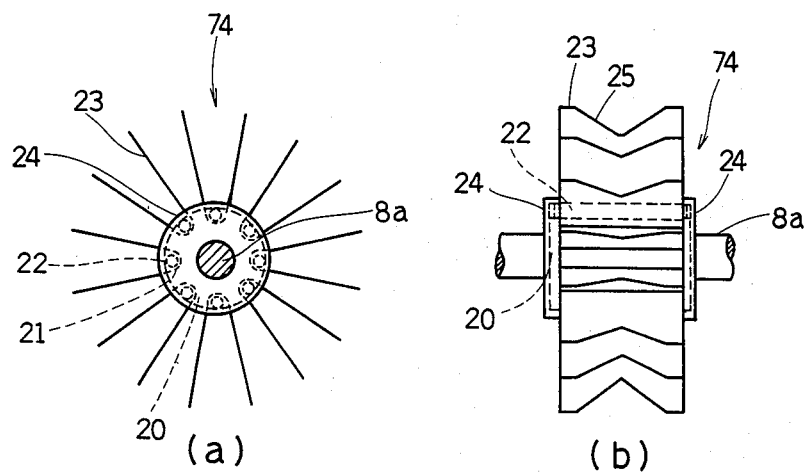
FIG. 6(a) is a side elevation showing a further example of the construction of the solder residue scraping drum.
FIG. 6(b) is a front elevation showing the construction of FIG. 6(a)
Figure 7:
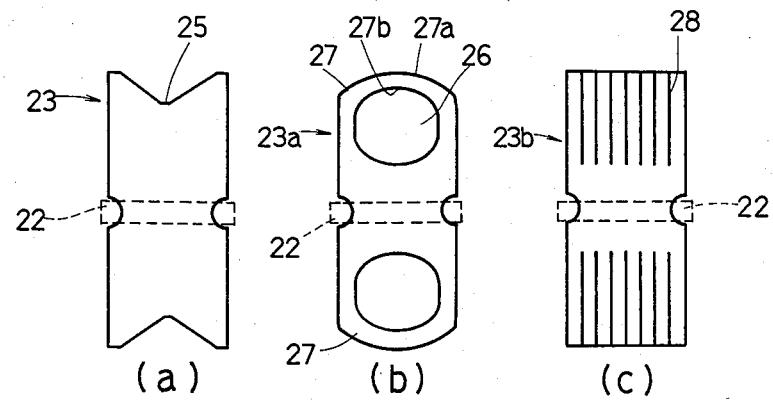
FIG. 7(a), 7(b) and 7(c) are expanded views showing examples of the construction of solder residue scraping members, respectively.
Figure 8:
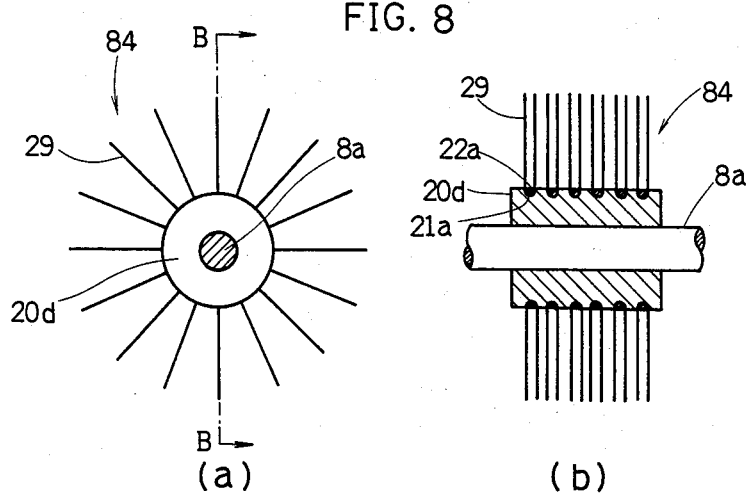
FIG. 8(a) is a side elevation showing a further example of the construction of the solder residue scraping drum.
FIG. 8(b) is a front elevation showing the construction of FIG. 8(a)

In the present embodiment, moreover, it is possible to suitably apply not only the drum 14 shown in FIG. 2 but also the drum 74 or 84 shown in FIG. 6 or 8.

Figure 10:
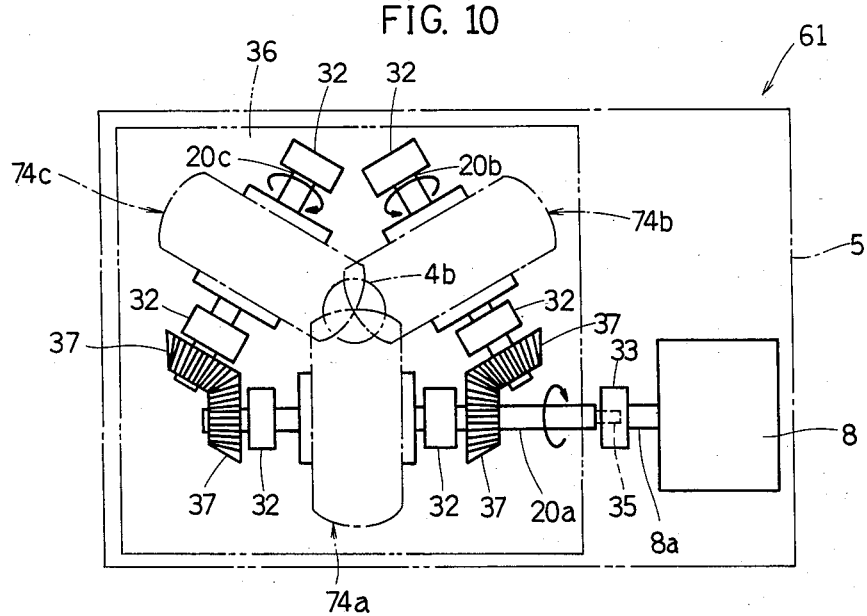
FIG. 10 is a front elevation showing still another embodiment of the present invention.

FIG. 10 shows a further embodiment, in which a copper bit cleaner 61 has three drums arranged in the form of letter "Y". The drive force of the motor 8 is transmitted on one hand to the shaft 20a of a first drum 74a through a joint 33 fixed to the shaft 8a and on the other hand to the shafts 20b and 20c of second and third drums 74b and 74c through bevel gears 37 which are fixed to the shafts 20b and 20c of the second and third drums 74b and 74c. These three drums 74a, 74b and 74c rotate in the same direction and at the same speed at their intersecting portions.

The drums 14, 74 and 84 shown in FIGS. 2, 6 and 8 can be suitably used as those first, second and third drums 74a, 74b and 74c. In the present embodiment, however, there are used the drums which are constructed by anchoring the film members 23a shown in FIG. 7(b) on the drum 74 of FIG. 6.

When the copper bit 3 is inserted through a bit aperture 4b into the cleaner 61 thus constructed, the film members 23a come into contact from the three sides to clean the semi-circumferences of the copper bit 3, respectively, so that the whole circumference can be cleaned for a short time period without turning the soldering tool.

Figure 11:
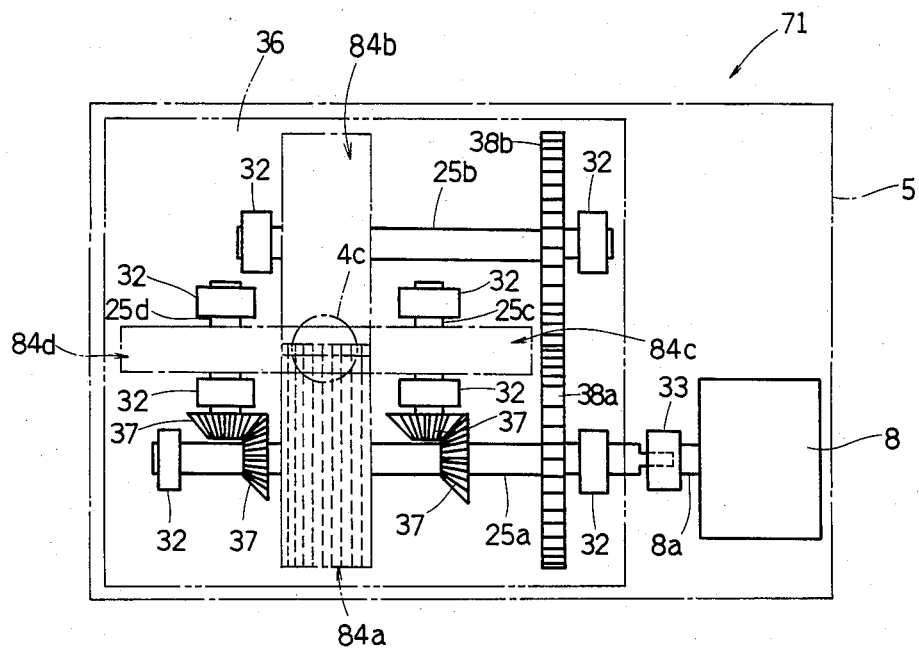
FIG. 11 is a front elevation showing the construction of a further embodiment of the present invention.

FIG. 11 shows a further embodiment, in which a copper bit cleaner 71 is constructed to have its four drums arranged in a cross form. The drive force of the motor 8 is transmitted to the shaft 25a of a first drum through the shaft 8a and the joint 33, to an opposed second drum 84b through gears 38a and 38b, and to third and fourth crossing drums 84c and 84d through the bevel gears 37, respectively. These drums 84a, 84b, 84c and 84d are rotated in the same direction and at the same speed at their intersecting portions.

Incidentally, the drums 74 and 84 shown in FIGS. 6 and 8 can be suitably used as the first to fourth drums 84a to 84d. In the present embodiment, however, the drums 84 shown in FIG. 8 are used. Moreover, the first and second drums 84a and 84b are made wider whereas the third and fourth drums 84c and 84d are made narrower so that the frictional load upon the solder residue scraping members 29 may be lightened at their intersecting portions.

When the copper bit 3 of the soldering tool is inserted through a bit aperture 4c into the copper bit cleaner 71 thus constructed, the scraping members 29 come into contact from the four sides so that the copper bit 3 can have its whole circumference cleaned within a short time period without turning the soldering tool.

Figure 12:
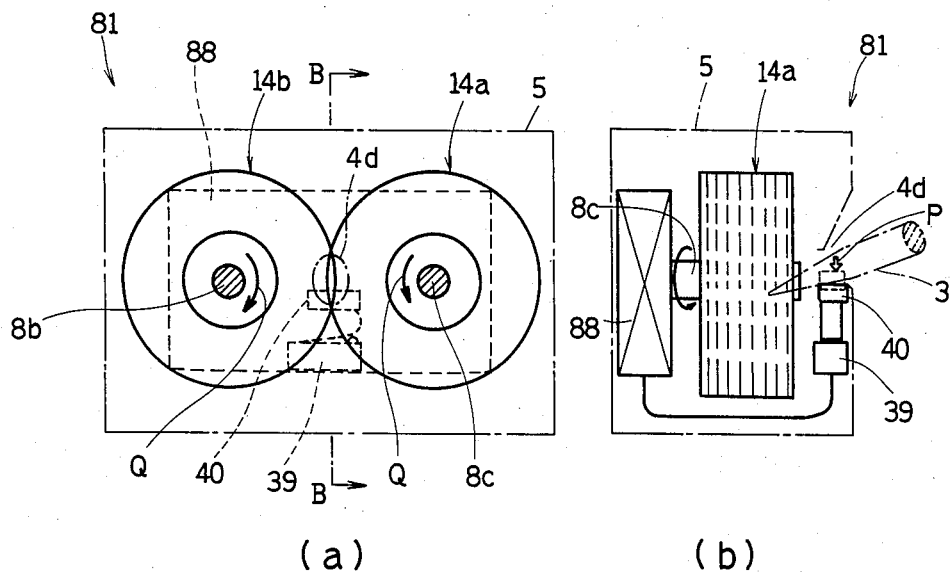
FIG. 12(a) is a front elevation showing the construction of a further embodiment of the present invention.
FIG. 12(b) is a section taken along line B—B of FIG. 12(a)

FIG. 12 shows a further embodiment of the present invention. In this embodiment, the copper bit 3 is inserted in the axial direction of the shaft 8b,8c into the intersecting portions of the first and second drums 14a and 14b of a copper bit cleaner 81 so that its circumference may be cleaned from both the sides in the directions to intersect the axis of the copper bit 3.

In FIG. 12, reference numeral 88 indicates a drive unit having an output shaft for rotating the two shafts 8b,8c in the opposite directions, and numeral 39 indicates a micro switch for energizing and deenergizing the drive unit 88. Indicated at numeral 40 is a moving member which protrudes into a bit aperture 4d such that it is depressed in the direction of arrow P by the weight or the like of the soldering tool, when the copper bit 3 is inserted, to turn on the micro switch 39.

When the copper bit 3 is inserted through the bit aperture 4d into the cleaner 81 thus constructed, the moving member 40 is depressed by the weight or the like of the soldering tool to energize the drive unit 88 so that the drums 14a and 14b start to rotate in the directions of arrows Q. When the copper bit 3 is then forced into the intersecting portions of the drums 14a and 14b, it is cleaned at the two sides by the solder residue scraping members. When the copper bit 3 is pulled, on the other hand, the micro switch 39 is turned off to interrupt the energization of the drive unit 88.

Thus, the cleaner 81 is operated, only while the copper bit 3 is being inserted into the cleaner 81, but is stopped on standby so that the time period for turning on and off the switch can be spared.

Incidentally, the drive unit of the drums should not be limited to the constructions exemplified in the foregoing embodiments but can use all rotation transmission mechanism, and it is arbitrary to insert a reduction gear mechanism.

Figure 13:
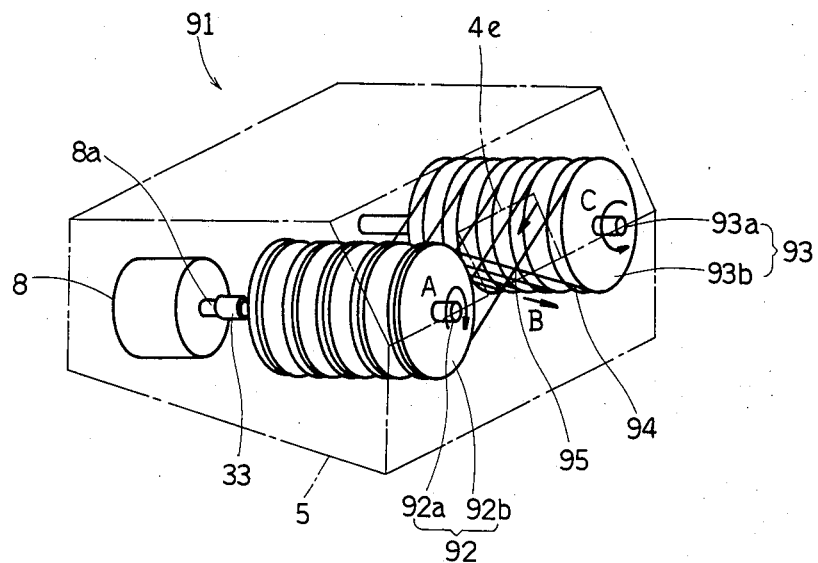
FIG. 13 is a perspective view showing the construction of the major portion of a further embodiment of the present invention.
Figure 14:
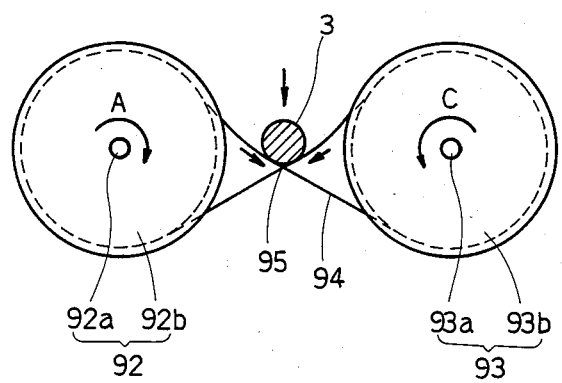
FIG. 14 is a front elevation showing the arrangement of the solder residue scraping members of the embodiment of FIG. 13.

FIG. 13 is a perspective view showing only major components of a copper bit cleaner 91 having a construction according to a further embodiment of the present invention. In FIG. 13, drive wheels 92 are composed of a shaft 92a and pulley 92b which is fixed on the shaft 92a and which is formed with grooves at a suitable spacing, respectively. The shaft 92a has its one end borne in a bearing (although not shown), which is fixed on the casing 5, and its other end connected to the shaft 8a of the motor 8 through the joint 33.

To the drive wheel 92, there is juxtaposed a driven wheel 93 which is composed of: a shaft 93a having both its ends borne in bearings (although not shown) fixed on the casing 5; and pulley 93b fixed on the shaft 93a and formed with grooves at a suitable spacing, respectively. Between the respective grooves of the pulleys 92b and 93b, there are extended under respectively suitable tensions in a crossing manner solder residue scraping members 94 such as kite strings which are looped to run in those grooves. When the motor 8 is energized, the drive wheel 92 is rotated in the direction of arrow A, and the solder residue scraping members 94 are driven to run in the direction of arrows B so that the drive wheel 93 is rotated in the direction of arrows C.

In this case, it is preferable to provide a mechanism which is spring-biased to pull the bearings (not shown) bearing the driven wheel 93 at the two ends in the rightward direction, as viewed in the drawing, so that the suitable tensions may be applied to the solder residue scraping members 94 at all times. With this provision, the elongations of the solder residue scraping members 14 due to aging can be absorbed to suitably tense the members 14 at all times.

Since the solder residue scraping members 94 are crossed, the tensed and slackened sides intersect at the middle of the pulleys 92b and 93b. The drive wheel 92 and the driven wheel 93 are borne by the bearings such that those intersecting points 95 are positioned to face a bit aperture 4e formed in the front side of the casing 5 and such that the train of the intersecting points 95 is inclined at an angle of about 30 degrees with respect to the bottom of the casing 5 (which is in parallel with the top surface of the working table).

The mechanism for energizing and deenergizing the motor 8 may be constructed such that a starter switch is operated by a member which is touched and displaced by the copper bit 3 when this bit 3 is inserted through the bit aperture 4e or such that a switch mounted on the surface of the casing 5 is manually turned on and off.

The copper bit cleaner 91 thus constructed performs the cleaning operation in the following procedures.

First of all, the soldering tool is held at an angle of inclination of about 45 degrees, and the copper bit 3 is inserted through the bit aperture 4e deeply into the copper bit cleaner 91. Next, the copper bit 3 is pushed down and applied to the intersecting points 95 of the solder residue scraping members 94 by a suitable force and is then moved and pulled toward the operator while being turned clockwise and counter-clockwise. The solder residue and the excess solder are removed from the copper bit 3 by performing those actions (which are similar to those in which the copper bit is to be cleaned by means of the sponge pads).

Since, in this case, the solder residue scraping members 94 are running transversely of the bit aperture 4e, the solder residue thus removed is scattered in the transverse directions. As a result, no solder residue will flow out from the bit aperture 4e.

Moreover, the solder residue scraping members 94 contact with the hot copper bit 3 for a very short period because they are running, and the solder residue and excess solder thus removed are promptly cooled down to solidify by the air and they are scattered. As a result, the solder residue scraping members 94 are little heated so that they are neither fused even after a prolonged use nor troubled in their cleaning action due to the solder residue caught thereby.

Thus, since the solder residue scraping members 94 run in abutment contact with the copper bit 3, they are desired to have a wide contact area, a suitable scale of undulations, a wear-resistance, a heat-resistance of about 120° to 130 ° C. and a little extension. From this standpoint, members twisted into a string, rope or woven into a ribbon shape having a suitable thickness can be suitably used as the solder residue scraping members 94.

In order to reduce extensions of the solder residue scraping members 94, there can be suitably used a hollow-woven cord which is knitted a highly heat-resistant material to cover a core which is composed of a material of small extension.

Figure 15:
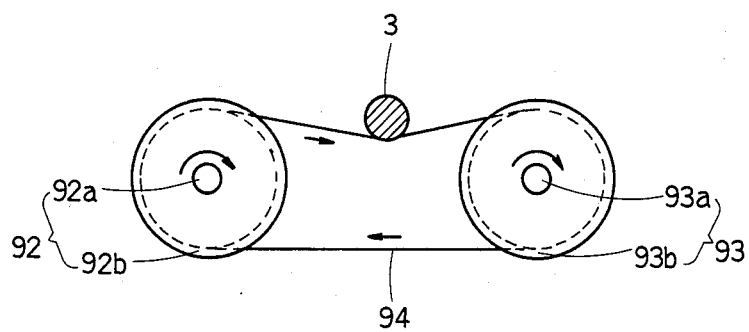
FIG. 15 is a front elevation showing another example of the arrangement of the solder residue scraping, members.
Figure 16:
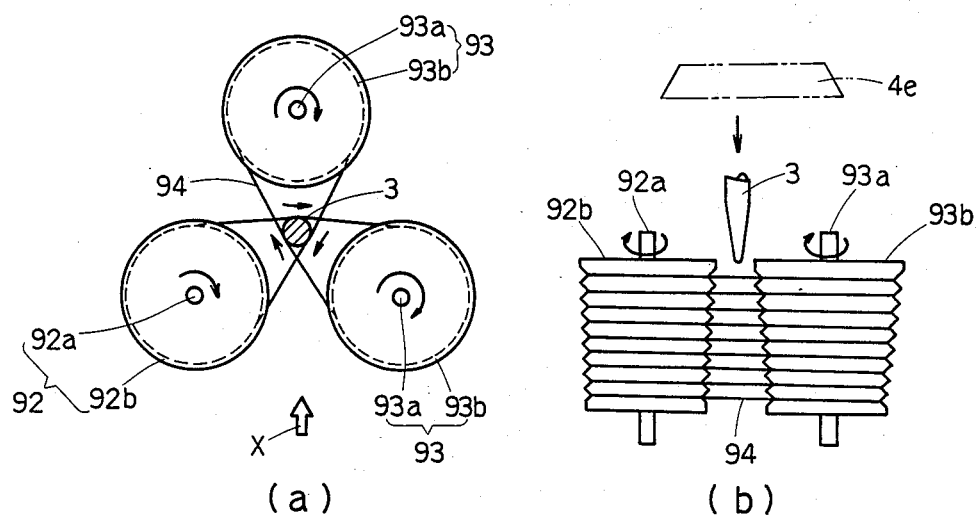
FIG. 16(a) is a top plan view showing still another example of the arrangement of the solder residue scraping members.
FIG. 16(b) is a view taken in the direction arrow X of FIG. 16(a).

FIGS. 15 and 16 show other examples of constructions concerning how to run the solder residue scraping members 94, respectively.

The embodiment of FIG. 15 is constructed such that the solder residue scraping members 94 are made to run in parallel between the pulleys 92b and 93b so that the copper bit 3 may be cleaned at the slack sides.

In the embodiment of FIG. 16, on the other hand, the drive wheel 92 and the two driven wheels 93 are arranged in a triangular form, and the solder residue scraping members 94 are made to run, as shown in FIG. 16(a), to form a triangular portion 96 in the intersecting center portion as will receives the copper bit 3. If the pulleys 92b and 93b are made to have larger diameters at the side of the bit aperture 4e and to have smaller diameters at the deeper side, as shown in FIG. 16(b), the triangular portion 96, which is defined by the solder residue scraping members 94 to receive the copper bit 3, becomes the narrower as it goes the deeper. If the pulleys 92b and 93b are designed to taper in a suitable manner, the copper bit 3 inserted can be brought into contact with the solder residue scraping members 94 simultaneously throughout its length so that its whole surface can be cleaned merely by moving back and forth the soldering tool while being slightly turned clockwise and counterclockwise.

As will be understood from the description thus far made, the solder residue scraping members are preferred to be made of a material having such a heat-resistance as will be neither molten nor degraded at the melting point of a solder, such a flexibility (including resiliency) as can deform, when it comes into abutment contact with the copper bit, along the circumference of the copper bit, such a hardness as will not wear the copper bit, a wear-resistance of itself and such properties as will not be sticked by the molten solder.

The solder residue scraping members are running at a considerably high speed so that they contact with the copper bit for a very short time period. As a result, their temperature is raised a little by the heat of the copper bit. Since the solder residue scraping members are cooled down by the air during their runs, moreover, they are not fused if they are made of a material having a heat resistance of 120° to 140 ° C.

Specifically, the solder residue scraping members can be made of a wide variety of materials including natural fibers such as cotton, flax or hemp-palm fibers, synthetic resins such as nylon, polycarbonate, polyethylene terephthalate or vinylon, or fine wires of stainless steel.

These materials are used solely or jointly to knit strings, ropes or ribbons having such a construction as has a high surface friction and a small extension when in use. This structure may also be shaped into a film.

On the other hand, the mechanism for holding one or two ends of the solder residue scraping members on their holding means may resort to any of adhering, binding or hooking method.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed:

1. A copper bit cleaner comprising: a casing formed with a bit aperture for allowing the copper bit of a soldering tool to be inserted therethrough; a plurality of flexible solder residue scraping members each formed so as to intermittently contact a portion of a circumference of said copper bit when said scrapings members are rotated; solder residue scraping member holding means cased in said casing and holding said solder residue scraping members, said solder residue scraping member holding means including at least one drum, said drum further including a pair of disks fixed on a shaft of said drum and said plurality of solder residue scraping members each comprise an elongated member tensed at a predetermined spacing from one another between the circumferential edges of said disks, said elongated members being selected from the groups consisting of string, metal wires or chains; and drive means for rotationally driving said solder residue scraping member holding means at a high speed so that solder residue scraping members may slide on a circumference of the copper bit, which is inserted through said aperture, at a high speed to scrape off the solder residue thereby to split the scraped solder residue off from said solder residue scraping members by the centrifugal forces thereof.

2. A copper bit cleaner comprising: a casing formed with a bit aperture for allowing the copper bit of a soldering tool to be inserted therethrough; a plurality of flexible solder residue scraping members each formed so as to intermittently contact a portion of a circumference of said copper bit when said scrapings members are rotated; solder residue scraping member holding means cased in said casing and holding said solder residue scraping members, said solder residue scraping member holding means including three drums arranged in a form of a letter "Y" and in such a spacing that their respective solder residue scraping members have leading end portions intersecting when they are rotated and that the intersecting portions of said solder residue scraping members are positioned to face the bit aperture of said casing, and adapted to be driven rotationally in a direction from the side facing said bit aperture to said intersecting portions; and drive means for rotationally driving said solder residue scraping member holding means at a high speed so that said solder residue scraping members may slide on a circumference of the copper bit, which is inserted through said aperture, at a high speed to scrape off the solder residue thereby to split the scraped solder residue off from said solder residue scraping members by the centrifugal forces thereof.

3. A copper bit cleaner comprising: a casing formed with a bit aperture for allowing the copper bit of a soldering tool to be inserted therethrough; a plurality of flexible solder residue scraping members each formed so as to intermittently contact a portion of a circumference of said copper bit when said scraping members are rotated; solder residue scraping member holding means cased in said casing and holding said solder residue scraping members, said solder residue scraping member holding means including four drums arranged in a cross form and in such a spacing that their respective solder residue scraping members having leading end portions intersecting when they are rotated and that the intersecting portions of said solder residue scraping members are positioned to face the bit aperture of said casing, and adapted to be driven rotationally in a direction from the side facing said bit aperture to said intersecting portions; and drive means for rotationally driving said solder residue scraping member holding means at a high speed so that said solder residue scraping members may slide on a circumference of the copper bit, which is inserted through said aperture, at a high speed to scrape off the solder residue thereby to split the scraped solder residue off from said solder residue scraping members by the centrifugal forces thereof.

4. A copper bit cleaner comprising: a casing formed with a bit aperture for allowing the copper bit of a soldering tool to be inserted therethrough; a plurality of flexible solder residue scraping members each formed so as to intermittently contact a portion of a circumference of said copper bit when said scraping members are rotated; solder residue scraping member holding means cased in said casing and holding said solder residue scraping members, said solder residue scraping member holding means including a drive wheel cased in said casing, and a plurality of driven wheel juxtaposed to said drive wheel, and wherein said solder residue scraping members are elongated members made of a looped and heat-resisting material and wound between said drive wheel and said driven wheels, said elongated members extending such that they intersect an axis of the copper bit, which is inserted through said bit aperature, and such that they are positioned to allow the side of the copper bit to be applied to their tensed or slackened portions; and drive means for rotationally driving said drive wheel of said solder residue scraping member holding means at a high speed so that said solder residue scraping members may slide on a circumference of the copper bit, which is inserted through said bit aperture, at a high speed to scrape off the solder residue thereby to split the scraped solder residue off from said solder residue scraping members by the centrifugual forces thereof.

5. A copper bit cleaner according to claim 4, wherein said solder residue scraping members are crossed between said drive wheel and said driven wheels and have their intersecting portions positioned to face said bit aperture so that their intersecting portions can be applied to the side of said copper bit.

* * * * *